United States Patent

[11] 3,609,323

| | | |
|---|---|---|
| [72] | Inventor | George H. McDaniel<br>Northville, Mich. |
| [21] | Appl. No. | 827,285 |
| [22] | Filed | May 23, 1969 |
| [45] | Patented | Sept. 28, 1971 |
| [73] | Assignee | The Bendix Corporation |

[54] INTERPOLATING SERVOMECHANISM CONTROL SYSTEM WITH OPERATIONS CARRIED OUT IN BINARY CODED DECIMAL FORMAT DUE TO A "PLUS-SIX" CORRECTION FACTOR
9 Claims, 4 Drawing Figs.

[52] U.S. Cl. ............................................. 235/151.11,
318/573, 318/603
[51] Int. Cl. .................................................. G05b19/18,
G06f 15/46
[50] Field of Search ........................................... 235/151.1,
151, 151.11, 150.3, 150.31, 92, 169, 170;
318/20.105, 20.108, 20.120, 20.130, 20.132,
20.370

[56] References Cited
UNITED STATES PATENTS

| 3,112,396 | 11/1963 | Heywood .................... | 235/170 |
| 3,248,622 | 4/1966 | Kelling .................. | 235/151.11 (F) UX |
| 3,327,101 | 6/1967 | Evans ..................... | 318/29 (20.735) X |
| 3,466,515 | 9/1969 | Madsen et al. ......... | 318/162 (20.520) X |
| 3,475,997 | 11/1969 | Wohlfeil ............... | 318/162 (20.320) X |

Primary Examiner—Malcolm A. Morrison
Assistant Examiner—Joseph F. Ruggiero
Attorneys—Plante, Hartz, Smith & Thompson and Hix and Smith ABSTRACT: An electronic position control system for use for controlling continuous path machining operations wherein a cutting tool is moved relatively to a workpiece along a path which depends on the component motions of the servomechanisms moving the cutting tool and the workpiece relatively to each other. The individual servomechanisms displacing the cutting tool and the workpiece relatively to each other along each axis are adapted to be actuated by a controller according to the number of pulses received at their input, and the pulses are derived from input numerical data in binary coded decimal form indicating the increments of motion to the final relative position of the cutting tool, such numerical data being continually added one digit at a time to a remainder and each pulse supplied to each servomechanism being the result from the overflow of such addition. Each time a carry occurs, or a sum greater than nine is obtained for a digit, the number six is automatically added to the addition remainder to provide an arithmetically correct sum in binary coded decimal form which is stored in the remainder register for further addition with the integrand until an appropriate number of pulses in each train is supplied at the output of the controller.

PATENTED SEP28 1971

INVENTOR
GEORGE H. McDANIEL

By William F. Thornton

INVENTOR
GEORGE H. McDANIEL 3,609,323

INTERPOLATING SERVOMECHANISM CONTROL SYSTEM WITH OPERATIONS CARRIED OUT IN BINARY CODED DECIMAL FORMAT DUE TO A "PLUS-SIX" CORRECTION FACTOR

BACKGROUND OF THE INVENTION

Electronic systems capable of receiving numerical data and of acting to control the position of an output element in accordance with the data are well-known. Such systems are commonly used to control motion of the operating parts of a machine tool such that the cutting tool of the machine tool and the workpiece are relatively displaced along a continuous path in order to produce a finished workpiece of predetermined shape and dimension as represented by the numerical data provided to the system. In one well-known type of system, the input numerical data is in the form of punched tape or magnetic tape presenting blocks of information in the form of rows of punched holes or discrete magnetized areas on the tape. The information recorded on the tape is in the form of coded instructions which are read by an appropriate tape reader and which are supplied to a controller for generating electrical pulse trains in accordance with the instructions contained on the tape, the pulses being introduced into a servomechanism for producing discrete movement of a mechanical output device, such as for example a machine tool lead screw, for each pulse which is received. The number of pulses received by the servomechanism determines the total distance through which the cutting tool is caused to move relatively to the workpiece, and the rate of pulse introduction into the servomechanism determines the rate of the cutting tool movement. The tape generally carries several consecutive groups of instruction or words, each of which is adapted to act through a separate servomechanism to control the relative motion along a different axis of the cutting tool relatively to the workpiece. The resultant movement of the cutting tool relatively to the workpiece is the algebraic or vector sum of the component movements as generated by the various servomechanism in different axes.

The numerical instructions contained on the tape generally relate to incremental distances to be traveled by the tool, for example, between a series of points along each predetermined coordinate axis. The control system operates the servomechanisms to move the cutting tool relatively to the workpiece through a series of straight lines connecting these points. Alternately, the instruction may represent the coordinates of the end points of a nonlinear path, and the control system must then direct the appropriate servomechanisms to displace the cutting tool relatively to the workpiece by the coordinated action of the servomechanisms, for example along two different axes, so as to generate this nonlinear path between the end points.

In U.S. Pat. No. 3,002,115 and 3,128,374, both assigned to the assignee of the present application, are disclosed control units accepting numerical data in coded form and making use of multiplier units for providing output signals taking the form of pulse trains in each of which the number of pulses and the time relationship to one another are functions of the input data, such pulse trains being supplied to the input of the servomechanisms. In U.S. Pat. No. 3,128,374 is disclosed in addition, an input logic section receiving data from the tape reader in a binary coded decimal form and converting the data from binary coded decimal form to binary form, storing the information in binary form and effecting the appropriate multiplications in a register for supplying trains of pulses to the input of the servomechanisms.

The present invention provides an improvement upon such system providing a control system capable of accepting data information in a binary coded decimal form, storing the information in such binary coded decimal form, effecting repeated additions of each digit of each binary coded decimal number or integrand with the contents of a register or remainder of the preceding additions, so as to supply at the output of the controller at least a pair of pulse trains for inputs to appropriate servomechanisms. Each binary digit of the integrand is handled individually from a register to an adder unit in which it is added to the remainder and a pulse in the train pulse is generated for each overflow from the most significant digit in the adder. All the individual digits of the binary coded digital number are serially handled in the same manner, and the resulting train of pulses, with each pulse therein corresponding to an overflow from the most significant digit in the register adder, is applied to the appropriate servomechanism. Each time a 10 carry occurs as a result of the addition of each individual digit, i.e., each time the summation becomes greater than nine, or each time the summation is 16, a digit six is added to the summation so as to provide a correct remainder of the sum of the digits after carry, and the resultant remainder is stored in an appropriate register for recirculation through the register adder in which it is continually added to the integrand until each servomechanism has been caused to displace the cutting tool relatively to the workpiece to the appropriate final point along the required path. For linear interpolation, the integrand is the binary coded decimal increment digit itself which is continually added to the remainder, while for nonlinear interpolation, the integrand is an appropriately variable number supplied from a nonlinear interpolation control unit.

The advantages procured by the present invention are obvious when it is observed that the information, or instruction input data, is in a binary coded decimal form, that the interpolation operation is effected on such information in a binary coded decimal form without converting to straight binary form, and when it is further considered that other elements of the system, such as auxiliary position visual displays, "dialed" permanent input data, and the like, are also in a binary coded decimal form.

SUMMARY OF THE INVENTION

The present invention has therefore for a principal object to provide a controller for numerical control systems which accepts data in digital coded decimal form, which stores such data in its original digital coded decimal form in recirculating registers and computing elements for supplying train pulses of appropriate rate and duration to a plurality of servomechanisms displacing a cutting tool relatively to a workpiece, along a linear or nonlinear path as directed by the information contained on a tape coded in a binary coded decimal form.

The many objects and advantages of the present invention will become apparent to those skilled in the art when the accompanying description of an example of embodiment for practicing the invention is considered in conjunction with the accompanying drawings wherein:

DETAILED DESCRIPTION OF THE PREFERRED EMBODIMENTS

Figure 1:
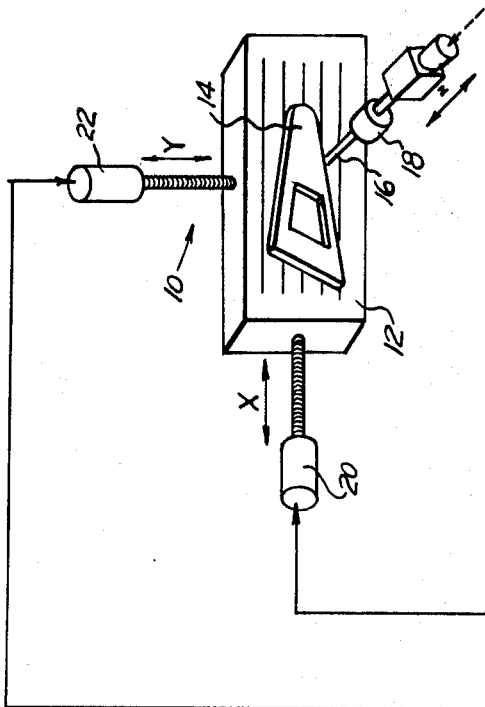
FIG. 1 represents a simplified block diagram of the control system of the present invention.
Figure 1:
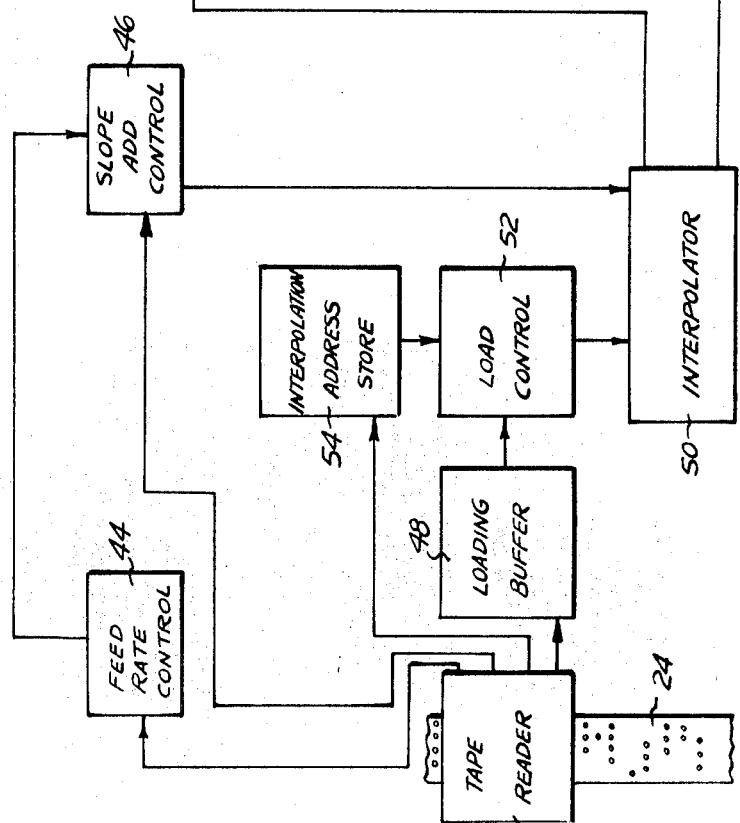

Referring to FIG. 1, there is shown in block diagram form and in a schematic manner an example of the present invention consisting of the pertinent portion of the controller of a numerically controlled machine, such as a milling machine for example, for the purpose of explaining the principles of the invention. The milling machine, generally designated at 10, has a table 12 adapted to support a workpiece 14 mounted thereon. A cutting tool, such as a milling cutter 16, driven by a spindle 18 is adapted to remove material from the workpiece 14 so as to provide a finished part to particular dimensions and to a predetermined shape. The table 12 and the tool 16 are movable relatively to each other along three mutual perpendicular axes designated respectively as the X-, Y- and Z-axis It is obvious that the table may be maintained stationary and the tool may be moved relatively to the table along any one of the three axes individually or collectively, or the table may be movable along the three axes, the example illustrated showing the table 12 as being movable along the X- and Y-axis by way of, respectively, servomechanisms 20 and 22 provided with appropriate lead screws for displacing the table 12 relatively to the machine tool bed, not shown, while the tool is movable along the Z-axis The present invention will be explained, for illustration, in terms of controlling the simultaneous operation of the servomechanisms 20 and 22, relatively to the X- and Y-axis, so as to cause a relative displacement between the cutting tool 16 and the workpiece 14 along a two dimensional continuous linear or nonlinear path. It will, however, be appreciated that the control system of the invention is capable of displacing objects relatively to one another in a continuous path in a single plane as well as in continuous paths in perpendicular planes, and that the invention has many other machining applications than the one particularly illustrated and herein described, such as positioning controls in general, and the like. The servomechanisms, such as shown at 20 and 22, represent the output of the system, while the input of the system is in the form, for example, of a flexible tape 24 punched with a series of holes in appropriate patterns or, alternately, in the form of a magnetic tape provided with a plurality of discrete magnetized areas disposed according to a predetermined pattern. An example of a section of tape is shown in detail in FIG. 2. The information, or instruction, stored on the tape is read by a tape reader 25 which operates upon one transverse row of information at a particular time.

Figure 2:
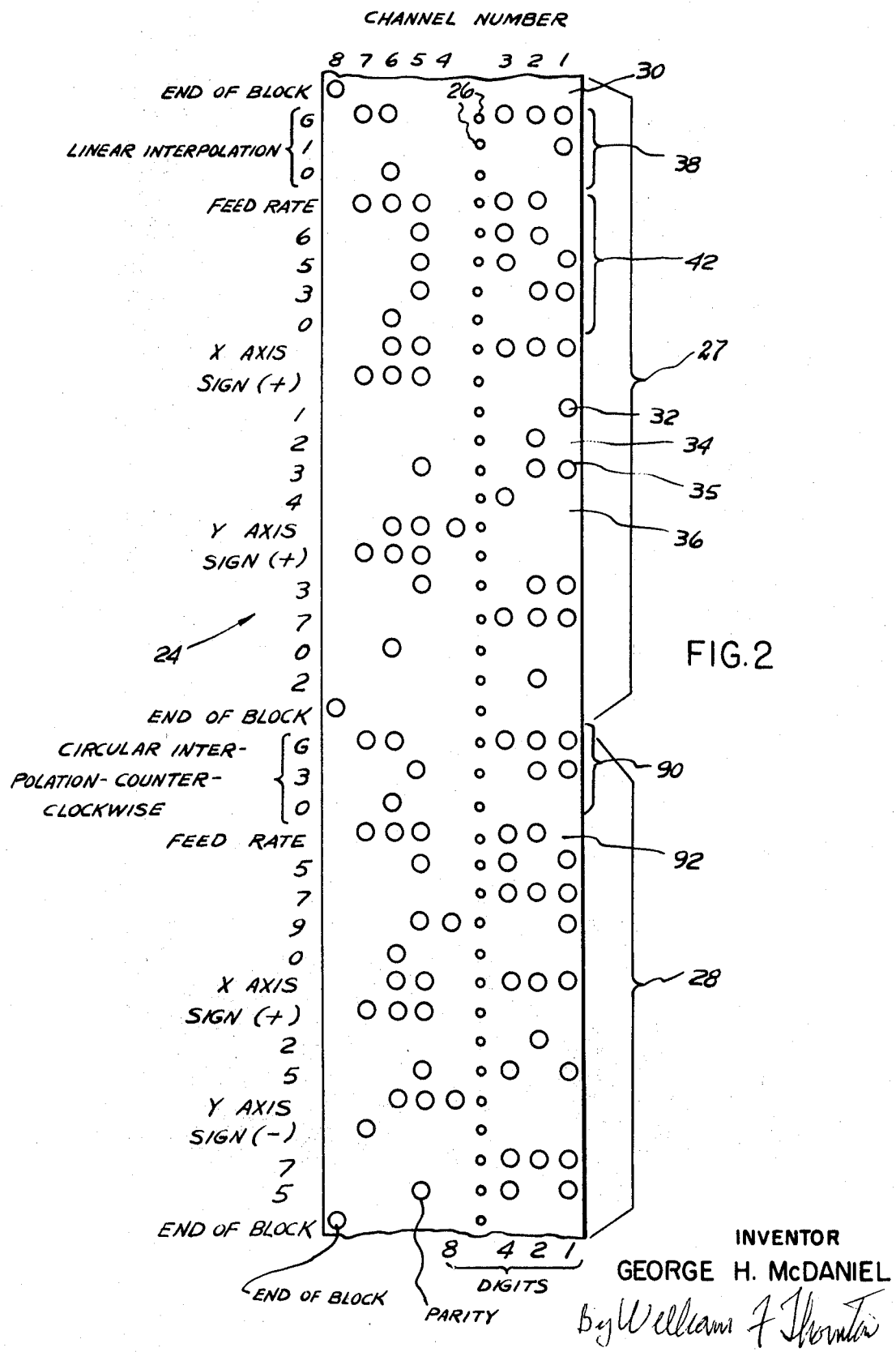
FIG. 2 is an example of a portion of tape used in connection with the controller of the invention.

As shown in FIG. 2, the tape 24 has eight longitudinal columns or channels numbered channels 1 through 8 at the top of the drawings and a longitudinal row of sprocket holes 26 separating channel 3 from channel 4. The section of perforated tape 24 shown at FIG. 2 illustrates a portion containing two blocks of instruction. The first block of instruction 27 instructs the controller to effectuate linear interpolation for causing the milling machine to cut a linear path from the tool preceding position, whose end of block is shown at row 30, the coded number G10 arbitrarily representing the instruction to the controller to effectuate such linear interpolation at a feed rate indicated as being 6530 in the present example. The displacement vector coordinates determining the final position of the cutting tool relatively to the workpiece are given respectively as ±1234 on the X-axis and +3702 on the Y-axis, relatively to the starting point coordinates. The second block of instructions 28 is preceded by a G30 code arbitrarily chosen for indicating circular interpolation in a counterclockwise direction, followed by the feed rate and relative coordinates of the final point to be occupied by the cutting tool relatively to the workpiece, such relative coordinates being +25 along the X-axis and −75 along the Y-axis.

It can be seen on FIG. 2 that the numerical instructions encoded on the tape are in the form of holes in the appropriate channels, channels 1 through 4 designating the binary digits 1, 2, 4 and 8, respectively. Channel 5 is a parity or error-checking channel in which a hole is automatically punched by the tape punch when the total number of all the holes in one row is even, such that the total number of holes in each row is always an odd number.

The displacement coordinates along the diverse axes are expressed in the binary coded decimal form, each row providing in a binary form the appropriate digit forming the decimal number in the decreasing order of digit significance. For example, number 1234 is represented by a hole punched in channel 1 of row 32 representing most significant decimal digit 1 (binary 0001), a hole punched in channel 2 of row 34 to represent decimal digit 2 (binary 0010), a hole punched in channels 1 and 2 of row 35 to represent digit 3 (binary 0011), and by a hole punched in channel 3 of row 36 to represent least significant decimal digit 4 (binary 0100), of the decimal number 1234.

The normal functions of the controller when accepting instruction causing relative motion of the cutting tool and workpiece along a straight path parallel to one of the axes will not be discussed herein, as they form no part of the present invention, and no portion of the control system for effecting such operation is shown in the drawings, the present disclosure concerning itself with the controller operation resulting in linear and nonlinear interpolation. It will be appreciated by those skilled in the art that the diverse logic functions effected by the elements of the present invention are effected by well-known electronic storing, transferring, integrating, gating and like elements such as registers, adders, gates, etc., and that detailed description of such elements is unnecessary for proper understanding of the present invention. It will also be appreciated that the sequence of operations of the controller is determined by a clock, not shown, and it will be apparent to those skilled in the art that the controller is appropriately synchronized by such clock and that the diverse manipulations, hereinafter described in detail, are effected in timed sequences by way of the appropriate logic components.

Each row of holes in the tape is read consecutively by the tape reader 25 of FIG. 1, such that the information read by the tape reader is serially read one binary digit at a time in each binary coded decimal number. The instructions read by the tape reader 25 are stored and are supplied to the appropriate elements of the controller according to the address instruction included in the block of instruction. Referring again to FIG. 2, the block of instruction 27 includes an address, arbitrarily designated G10, shown at 38, instructing the controller to effectuate linear interpolation. When such instruction is read by the tape reader, a slope add control unit 46, FIG. 1, is set, and when the feed rate address and number, shown at 42 in FIG. 2, is read by the tape reader 25, a feed rate control unit 44 is set, the feed rate number being stored for application to a slope add control unit 46. The tape reader 25 reads the X-axis and Y-axis numerical instructions and stores such instructions in a loading buffer 48. Both the X-axis data and the Y-axis data are in the binary coded decimal form. The data in the loading buffer 48 is transferred to an interpolator 50 when transfer or a load control 52 is activated by an interpolation address store 54 set by the linear interpolation instruction signal. The rate at which the binary coded decimal data is transferred to the interpolator 50 is controlled by the slope add control unit 46 according to the feed rate instruction. The logic circuits utilized for accomplishing the functions heretofore described are described in further details in U.S. Pat. Nos. 3,002,115, 3,128,374 and 3,530,283, all assigned to the assignee of the present application, and they form no part of the present invention.

Figure 3:
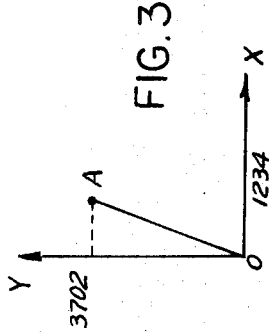
FIG. 3 is a graph useful in explaining linear interpolation.

Two trains of pulses appear at the output of the interpolator 50 during interpolation of the data, each train of pulses being applied, as shown, to respectively the X-axis servomechanism 20 and the Y-axis servomechanism 20 and the Y-axis servomechanism 22. Each pulse in the train of pulses represents an increment of displacement of the table 12 along a particular axis by way of the appropriate servomechanism, such increment of displacement being for example 0.0002 or 0.0001 inch, or a like minute displacement such that the final position of the cutting tool 16 relatively to the workpiece 14 is the resultant or algebraic sum of the number of pulses contained in each train within a predetermined period of time. The X- and Y-axis numerical data designate a displacement of the cutting tool relatively to its initial position, expressed in displacement vector coordinates respectively along the X-axis (1234) and the Y-axis (3702), as shown in FIG. 3, such that the path travelled by the cutting tool relatively to the workpiece is represented by line OA, O being the point of origin and A being the final point. The interpolator 50 of FIG. 1 is arranged to supply to the X-axis servomechanism 20, in a predetermined time slot, a given number of pulses and to supply to the Y-axis servomechanism 22 during the same time slot a predetermined number of pulses, the ratio of such numbers of pulses being the same as the ratio of the X-axis and Y-axis coordinates of point A relatively to the point O, i.e., in the example chosen, a ratio of 1 to 3.

Figure 4:
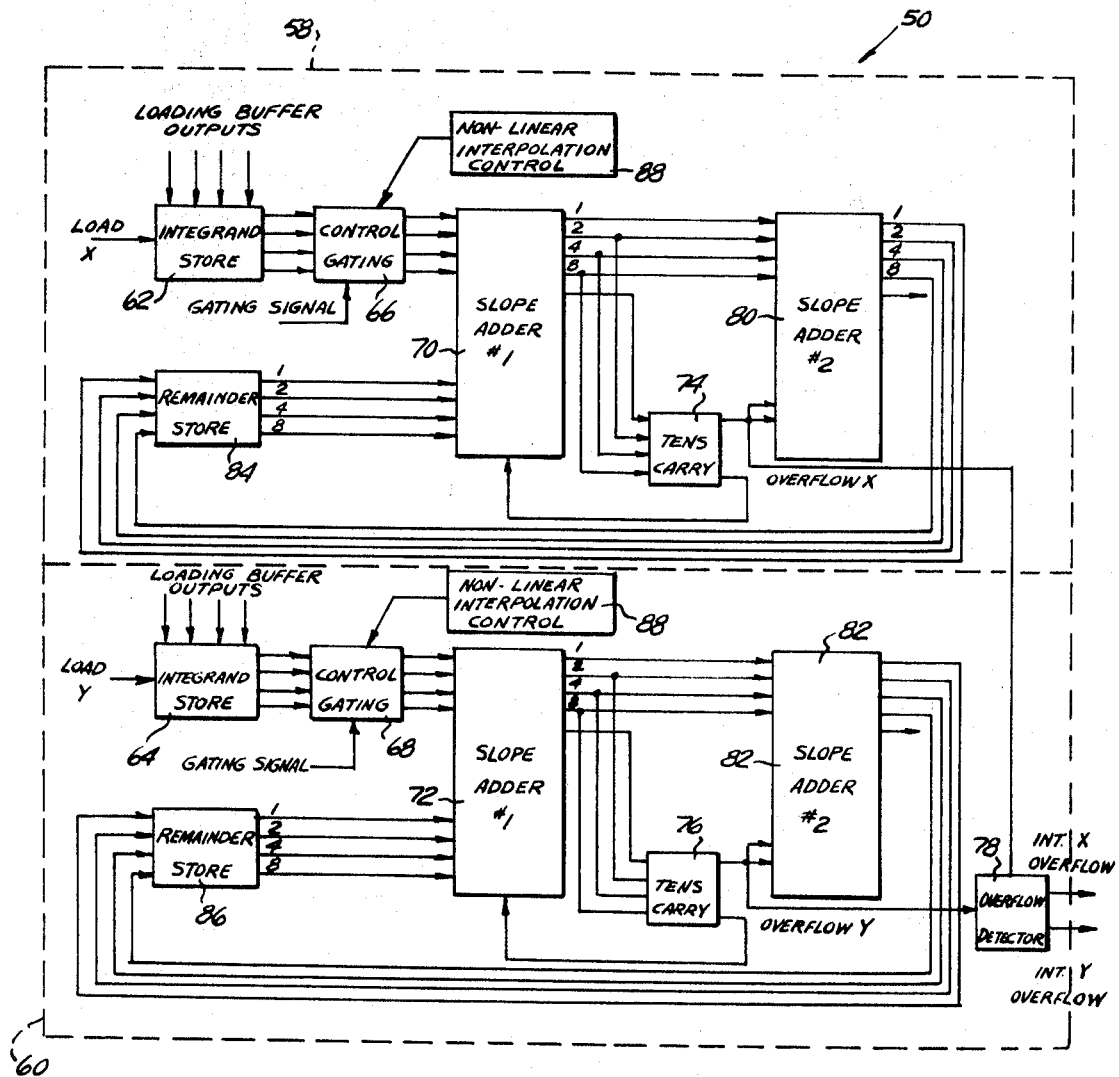
FIG. 4 is a schematic representation of the interpolator portion of the invention.

The interpolator 50 is shown in further detail at FIG. 4. The interpolator 50 includes an X-axis section 58 and a Y-axis section 60, identical in structure and in function. Upon receiving of a load signal from the load control of FIG. 1, the X-axis data is transferred from the loading buffer 48 of FIG. 1 to the integrand store 62 of the X-axis section 58 of the interpolator 50, and the Y-axis data is transferred to the Y-axis integrand store 64. When the control gatings 66 and 68 are set upon receiving an add signal from the slope add control 46 of FIG. 1, the data contained in the X-axis integrand store 62 and Y-axis integrand store 64 are transferred one digit at a time into the first slope adders 70 and 72, respectively, in which each digital digit of the number representing such data is added to an integrand which in the case of linear interpolation as presently discussed is the digit itself. Each successive digit of the binary coded decimal number is thus continually added to the remainder in the first slope adders 70 and 72 until the interpolation is completed. Each time that the addition of a digit results in an overflow from the most significant digit, the overflow through the 10 carry units 74 and 76, respectively, is applied to an overflow detector 78 which provides a pulse at its output such that a plurality of pulses is in turn applied to the appropriate X-axis and Y-axis servomechanisms.

After each digit has been added to the remainder in each first slope adder 70 or 72, the new remainder of the addition, that is the summation, is transferred to each second slope adder, designated respectively at 80 and 82, in which it is added to a zero in the event that there was no 10 carry during the addition in the first slope adder or, alternately, to the digit 6 (binary 01100) in the event that the summation therein is either greater than nine or equal to 16. The 10 carry units 74 and 76 are each operable to automatically store the digit 6 into each one of the second slope adders 80 and 82, respectively, each time there is a carry from the first slope adders 70 and 72. The remainder of the addition of the remainder in the second slope adders 80 and 82, respectively, with either a 0 or a 6 is transferred into the remainder stores 84 and 86, respectively, in which it is stored for further subsequent addition to the integrand, in the case of linear interpolation as presently explained, in the first slope adders. Each digit of the binary coded decimal number is operated upon in the hereinbefore-described manner until appropriate pulse trains of appropriate duration have been provided at the output of overflow detector 78, the rate of the interpolation being determined and controlled by the feed rate control 44, FIG. 1, under the dependence of the feed rate number.

In the event that a nonlinear interpolation is effected, the original digit stored in each integrand store register 62 or 64 is added to an integrand in the first slope adder 70 or 72, the integrand being supplied from a nonlinear interpolation control identified at 88. The principle of such nonlinear interpolation is the same as the principle of the hereinbefore described linear interpolation, i.e. each time an overflow occurs in each of the first slope adders 70 and 72, a pulse is provided at the output of the overflow detector 78 and each time the summation is either greater than nine or equal to 16, digit 6 is stored in the appropriate second slope adder to which the remainder of addition in the first slope adder is transferred for addition thereto of the digit 6, after which the remainder of the second slope adder is transferred to the remainder store for further addition with the integrand in the first slope adder. When there is no carry from the first slope adder, the remainder of the addition is added to zero in the second slope adder, such that the remainder is unchanged and is transferred as such into the remainder store 82 or 86.

When the tape instructions are preceded by a nonlinear interpolation address, the interpolation number or integrand is nonlinear a nonlinear interpolation control 88 and is a continuously changing number, as provided, for example, at the output of a differential digital analyzer according to techniques well known to those skilled in the art. When the nonlinear interpolation is a circular interpolation, the direction of relative motion of the tool, i.e. clockwise or counterclockwise, is supplied by appropriate instructions on the tape. In the example of instructions shown on the tape section of FIG. 2, in the portion 90 of the block 28, the address code G30 arbitrarily indicates a counterclockwise circular interpolation, and the integrand is supplied by the nonlinear interpolation control 88 of FIG. 4 under the control of feed pulses from the feed rate control 44 of FIG. 1, the rate of pulses depending from the feed rate instruction of row 92 on the tape. As disclosed in U.S. Pat. No. 3,128,374, in the case of circular interpolation, the integrand is a continuously changing number, while it is a constant number in linear interpolation, but the principles of the invention remain obviously the same.

The arithmetic involved in the slope adders during linear interpolation is as follows:

Referring again to FIG. 2, it can be seen that the instructions for linear interpolation contained in block 26 in tape 24 include a coordinate vector number for the X-axis this number being 1234 expressed in binary coded decimal form. The number is stored in a loading buffer in the binary coded decimal form, each digit of the decimal number being individually stored in a binary form in the well-known 8421 code as follows:

| 1 | 2 | 3 | 4 |
|---|---|---|---|
| 0001 | 0010 | 0011 | 0100 |

The Y-axis number 3702 is stored similarly

| 3 | 7 | 0 | 2 |
|---|---|---|---|
| 0011 | 0111 | 0000 | 0010 |

Each binary digit of each number is interpolated by being individually operated upon as previously explained, an example being given hereinafter of the repeated addition of, for example, the least significant digit of the number 1234:

```
+   0000   Empty register.
    0100
    ----
    0100   Summation=4.
+   0100
    ----
    1000   Summation=8.
+   0100
    ----
    1100   Summation=12 (not a binary coded decimal digit).
```

It an thus be seen that the remainder, in the first slope adder becomes erroneous, not a binary coded decimal digit, each time there is a 10 carry. In order to bring the remainder to a correct coded digit each time there is a 10 carry, the digit 6 is added in the second slope adder to the remainder or summation of the first addition:

```
           1100
+          0110
           ----
Ten carry  0010   Remainder=2 (correct).
```

This remainder is then stored in the remainder store 84 for subsequent transfer into the fist slope adder for further addition to the integrand digit 4 (binary 0100), stored in the integrand store 62, arithmetically represented as follows:

```
+   0010
    0100
    ----
    0110   Summation=6.
+   0100
    ----
    1010   Summation=10 (not a binary coded decimal digit).
+   0110
    ----
Ten carry   0000   Remainder=0 (correct).
```

It can thus be seen that by the simple expedient of adding to the summation the number 6 each time there is a 10 carry from the first slope adder, the remainder is corrected for further addition to the integrand.

The 10 carry from the first slope adder 10 or 72 is detected by the 10 carry unit 74 or 76, respectively, by interrogating the summation in the adder. If a 1 is present in the most significant digit position, the summation is at least 8 and if a 1 is additionally present in any of the two next significant digit positions, the summation is at least 12 or 10 respectively. Consequently, the presence or not of a 1 in both the most significant digit position and either one of the two next significant digit positions of the first adder is detected by the 10 carry unit for automatically storing a 6 or a 0, as the case may be, in the second slope adder 80 or 82, as hereinbefore explained.

Each time a 16 carry occurs as a result of the addition of the integrand to the remainder, such carry being actually, in the binary coded decimal system a carry from one digit to the next most significant digit, the number 6 is also stored in the second slope adder to correct the remainder. For example, if the integrand digit is 8 (binary 1000), the successive additions are effected as follows:

```
         1000
    +    1000
         ----
 carry   0000   Remainder=0 (incorrect).
```

The correct remainder is 6. The above incorrect remainder is added to 6 stored in the second slope adder to provide a correct remainder for further addition to the integrand. The 16 carry, a normal carry in the binary coded decimal system, thus provides both an overflow producing a pulse at the output of the system of the present invention by means of the overflow detector 78 and a storage of the digit 6 in the second slope adder 80 or 82.

Having thus described the invention, what is sought to be protected by United States Letters Patent is as follows:

1. An electronic system for use with servomechanisms, said system being operative to receive data including blocks of information associated with particular paths to be followed by said servomechanisms, each block containing at least two numbers expressed in binary coded decimal form and representing vector coordinates of a point on said path taken along the axes which said servomechanisms may move and a code signal representing the nature of such path, either linear or nonlinear, said system being operative to generate pulse trains equal in number to said servomechanisms, each train containing a number of pulses proportional to the path distance along a particular coordinate, the pulses of each train occurring at instantaneous rates which are proportional to the necessary motion rate of the associated servomechanism at the instant, said system comprising: a first register for each of said servomechanisms and operative to store each of said numbers in its binary coded decimal form; a first adder; control means for initially storing each of said numbers a binary coded digit at a time in said first adder; control means for transferring an integrand for generating a pulse in a particular pulse train when overflow occur from the most significant digit following addition in said fist adder; a second adder; means for transferring the remainder of the addition of said binary coded digit and said integrand from said first adder to said second adder; means for adding binary coded digit six to said remainder in said second adder each time the summation of said first adder is greater than nine and each time said overflow occurs; a second register for each said first register; control means for transferring the remainder from said second adder to said second register; and means for further transferring said remainder from said second register to said first adder for further addition with said integrand.

2. The system of claim 1 wherein said integrand is each of said numbers stored in said integrand is each of said numbers stored in said first registers and said path is linear.

3. The system of claim 1 wherein said integrand is a constantly variable number and said path is nonlinear.

4. An electronic system operative to receive numerical data including at least a first plurality of numbers in binary coded decimal form representative of distances along mutually perpendicular axes and a signal indicating whether a curve which said numbers relate to is linear or nonlinear and to generate a first plurality of trains of pulses, said system comprising: a first register for each axis for receiving each of said numbers in binary coded decimal form; first adding means for adding each of said numbers a binary coded digit at a time to an integrand; means for detecting an overflow from the most significant digit as a result of adding said binary coded digit with said integrand; means for generating a pulse in a particular pulse train each time an overflow occurs from the most significant digit; second adding means for adding six units in binary coded form to the remainder of the addition of each binary coded digit of said number and said integrand each time said overflow occurs and each time said remainder is greater than nine; and means for storing the remainder from the second addition for continuously adding said last mentioned remainder to said integrand a binary coded digit at a time.

5 The system of claim 4 wherein said curve is linear and said integrand is the number in said first register.

6. The system of claim 4 wherein said curve is nonlinear and said integrand is generated from a nonlinear interpolation control.

7. An electronic system for controlling motion having as its input numerical data and providing output to a plurality of servomechanisms, said data including a plurality of blocks of information each relating to a particular motion to be achieved by said servomechanisms, each block including a plurality of numbers expressed in binary coded decimal digits representing distances along the axes controlled by said servomechanisms from a particular point on a path to be followed by said servomechanisms to a reference point, which varies from block to block, said system comprising: first registers for receiving said numbers one binary coded digit at a time; a summation register for each of said servomechanisms; means for adding said binary coded digits one at a time to an integrand; means for detecting an overflow resulting from said first addition; means for adding the remainder of said first addition to a binary coded six each time a 10 carry is detected and each an overflow occurs; means for storing the remainder of said second addition in one of said summation registers for continuous addition to said integrand and means to provide at least one pulse to said servomechanisms for each of said overflow and to terminate said additions when a sufficient number of pulses have been supplied to each servomechanism to achieve the motion dictated by the block of information.

8. The system of claim 7 wherein said path is linear and said said numbers in said first registers.

9. The system of claim 7 wherein said path is nonlinear and said integrand is supplied from an interpolation control.